(12) United States Patent
Herbert

(10) Patent No.: US 6,715,510 B2
(45) Date of Patent: Apr. 6, 2004

(54) ELECTRO-HYDRAULIC CONTROLLER FOR AUTOMATIC TRANSMISSIONS

(75) Inventor: David E. Herbert, Rochester Hills, MI (US)

(73) Assignee: Eaton Corporation, Cleveland, OH (US)

( * ) Notice: Subject to any disclaimer, the term of this patent is extended or adjusted under 35 U.S.C. 154(b) by 127 days.

(21) Appl. No.: 10/165,950

(22) Filed: Jun. 10, 2002

(65) Prior Publication Data

US 2003/0226527 A1 Dec. 11, 2003

(51) Int. Cl.⁷ ............................................. E16K 11/10
(52) U.S. Cl. ........................................................ 137/884
(58) Field of Search ........................................... 137/884

(56) References Cited

U.S. PATENT DOCUMENTS

| | | | | | |
|---|---|---|---|---|---|
| 4,498,500 A | * | 2/1985 | Miller | ........................ | 137/883 |
| 4,678,006 A | * | 7/1987 | Northman et al. | ...... | 137/596.17 |
| 5,269,490 A | * | 12/1993 | Fujikawa et al. | ....... | 251/129.15 |
| 5,474,108 A | * | 12/1995 | Inden et al. | ................. | 137/884 |
| 5,904,180 A | * | 5/1999 | Iwamura et al. | ............ | 137/884 |

* cited by examiner

Primary Examiner—John Fox
(74) Attorney, Agent, or Firm—Roger A. Johnson

(57) ABSTRACT

An electro-hydraulic controller having a plurality of solenoid operated valves mounted in inlet and outlet ported valving cavities on a non-metallic manifold block. The manifold block has inlet and outlet ports sealed by a gasket for communication with corresponding ports in a metallic base to which the manifold block is attached. The base is sufficiently rigid to resist prohibitive deflection when exposed to the forces of fluid pressure when secured over the open hydraulic channels of an automatic transmission shift circuit deck. The non-metallic manifold may be fabricated to "Net Shape" without costly secondary operations to achieve critical dimensions.

17 Claims, 3 Drawing Sheets

ELECTRO-HYDRAULIC CONTROLLER FOR AUTOMATIC TRANSMISSIONS

BACKGROUND OF THE INVENTION

The present invention relates to shift controllers for power transmissions employed in motor vehicles and particularly automatic transmissions employed in light trucks and passenger cars.

Heretofore, it has been desirable to have electronic controlling of the shifting in the vehicle automatic transmission and particularly desirable to integrate the electronic control circuitry with that employed for engine operational control in order to optimize the driveability and shift response of the transmission.

In known vehicle automatic transmissions, a plurality of solenoid operated shift control valves are mounted on a manifold which is attached to the transmission housing; and, the manifold is ported to communicate with corresponding fluid passage ports formed on the deck of the transmission housing. Heretofore, such known electro-hydraulic control manifold assemblies have utilized metal for the manifold in order to provide the requisite stiffness when exposed to the hydraulic fluid pressure in the passages formed in the transmission deck. However, a metal manifold has required costly machining operations to provide the valving chamber cavities and porting arrangements for receiving the solenoid valves and for making hydraulic connection to the ports on the transmission housing.

Thus, it has been desired to reduce the cost of manufacturing the manifold assembly without increasing the complexity or jeopardizing the reliability and resistance to the hydraulic pressures encountered.

BRIEF SUMMARY OF THE INVENTION

The present invention provides an electro hydraulic controller having a plurality of solenoid operated valves mounted on a manifold assembly which has a manifold block formed of non-metallic material attached by fasteners to a base formed of metallic material with the manifold ported to receive fluid through the base into respective individual valving cavities for the solenoid valves and the return flow through the base through outlet ports associated with each valve. A sealing gasket is disposed between the manifold block and the base and secured therebetween for sealing the flow ports therein. A gasket is provided under the base for attachment of the assembly to appropriate fluid passages formed on a vehicle transmission housing.

The invention thus provides for a one-piece manifold block which is formed of non-metallic material which may be molded with the ports and valving chambers thereon formed to finished dimensions, and thus eliminates the requirement for costly machining operations and thereby provides significant cost savings in the manufacture of the assembly. The manifold block in the present invention is preferably formed of plastic material preferably partially filled with particulate glass material; and, may be fabricated preferably by molding to "Net Shape" without costly machining operations to achieve critical dimensions.

The base is preferably cast from metallic material and does not require subsequent machining. In the present practice of the invention it has been found satisfactory to form the base of material selected from the group consisting essentially of (a) aluminum, (b) magnesium, (c) steel stamped from sheet stock and (d) equivalents thereof.

DETAILED DESCRIPTION OF THE INVENTION

Figure 1:
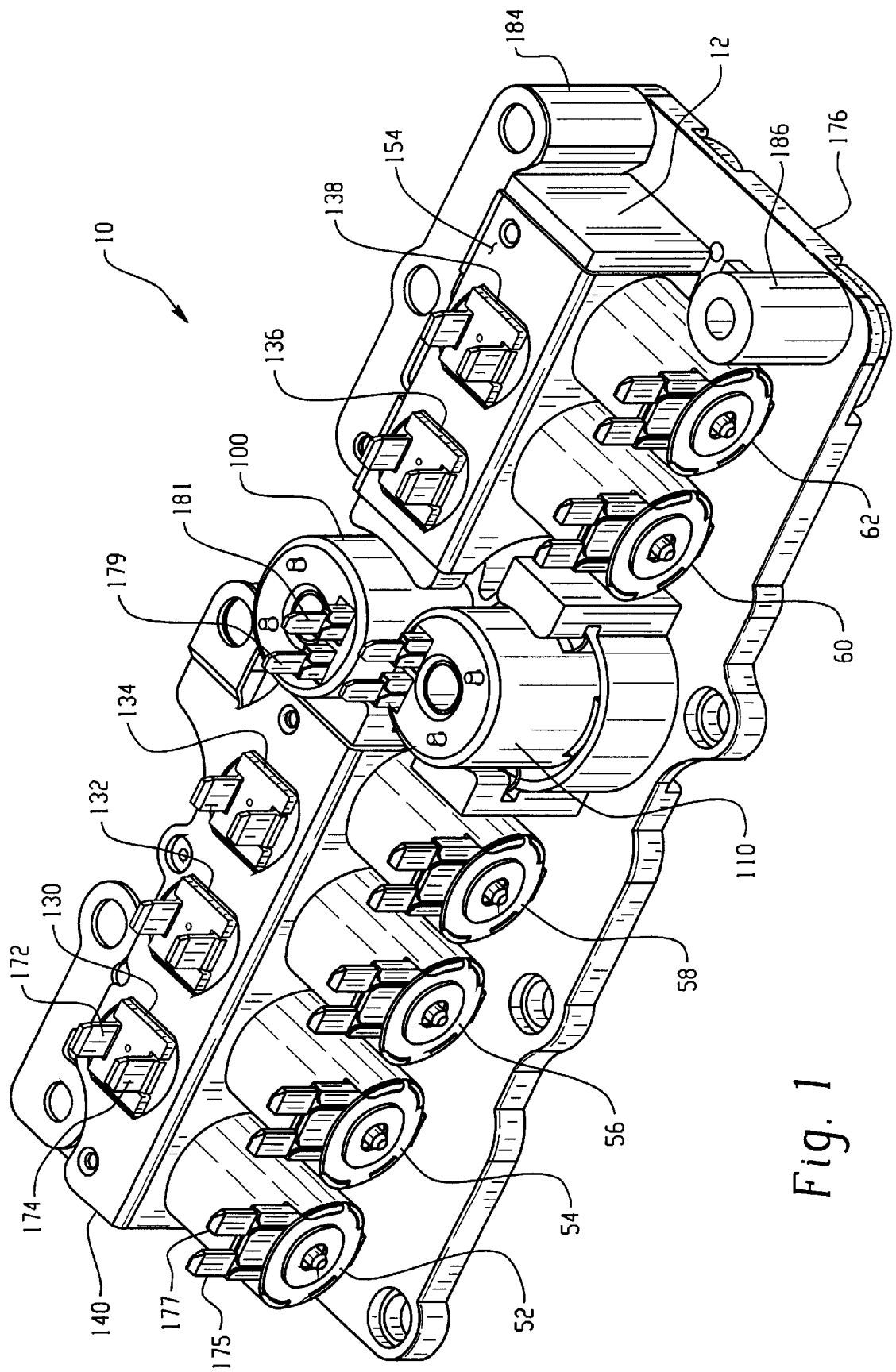
FIG. 1 is an axonometric view of the manifold assembly of the present invention; and, FIGS. 2a and 2b complete an exploded view of the assembly of FIG. 1 divided along parting line I—I.

Referring to the drawings, the electro-hydraulic control assembly of the present invention is indicated generally at 10 and has a manifold block 12 formed with a plurality of valving cavities 14, 16, 18, 20, 22, 24 formed therein in spaced relationship and preferably aligned. Each of the aforesaid valving cavities has respectively formed therein a supply port 28, 30, 32, 34, 36, 38; and, spaced from each aforesaid supply port an outlet port denoted respectively 40, 42, 44, 46, 48, 50 is provided in each of the valving chambers.

Into each of the valving cavities 14 through 26 is received a solenoid operated three-port valve having an inlet port, control signal outlet port and exhaust port and denoted respectively 52, 54, 56, 58, 60, 62. It will be understood that each of the solenoid valves 52 through 62 has provided thereon a seal ring denoted respectively 64, 66, 68, 70, 72, 74 which seals in the respective valving cavity to isolate the supply port from the control signal outlet port thereon. Each of the solenoid valves 52 through 62 has its control signal outlet port thereon (not shown) communicating respectively with one of the outlet ports 40 through 50 in the respective valving cavity. Each of the solenoid valves 52 through 62 has provided thereon an inlet port denoted respectively 76, 78, 80, 82, 84, 86 which communicates respectively with one of the inlet ports 28 through 38 formed in the valving cavities.

Figure 2A:
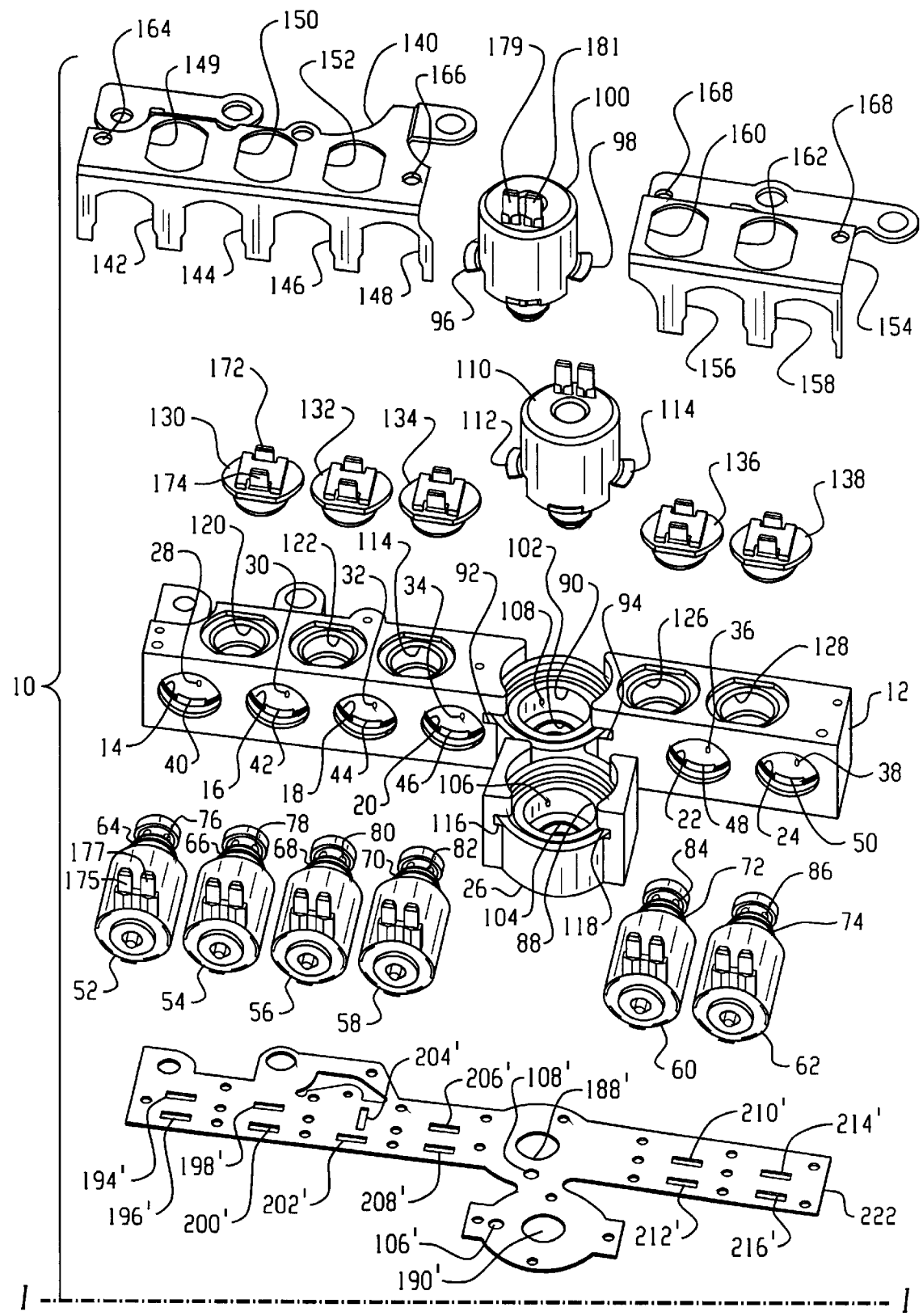

Each of the solenoid valves 52 through 62 has a control signal outlet port provided thereon on the opposite side of the respective sealing ring 64 through 74 from the inlet ports, which control signal outlet ports are not visible in FIG. 2a, but which nevertheless are disposed on the valve to communicate with respectively with one of the outlet ports 40 through 50 formed in the valving cavity.

Each of the valves 52 through 62 also has a second sealing ring thereon (not shown) located on the opposite side of the control signal port from the illustrated sealing ring which second unshown sealing ring functions to isolate the control signal outlet port from the exhaust port (not shown).

Referring to FIG. 1 and FIG. 2a, manifold block 12 has an extension 26 formed on one side thereof and located in the spacing intermediate valving cavities 20, 22 and which extension has formed therein an enlarged valving cavity 88 spaced adjacent a second enlarged valving cavity 90. Cavities 88 and 90 are formed in a side of the manifold generally at right angles to the direction of alignment of solenoids 52 through 62. The area of the manifold 12 adjacent the valving cavity 90 is undercut to provide a pair of oppositely disposed slots 92, 94. Slots 92, 94 are engaged respectively by tabs denoted 96, 98 formed on opposite sides of the large solenoid valve 100 by bayonet twist locking arrangement and which is effected by inserting valve 100 in cavity 90 with tabs 96, 98 oriented at right angles to the direction shown in FIG. 2a and then rotating the valve 100 through a quarter turn to engage the tabs 96, 98 in the slots 92, 94.

Valving cavity 90 has an inlet port 102 formed in the bottom thereof; and, cavity 88 similarly has an inlet port 104 formed in the bottom thereof. It will be understood that each of the valving cavities 88, 90 has provided therein an outlet port denoted respectively 106, 108 which communicates with an unshown outlet port provided in the undersurface of manifold 12.

Similarly an enlarged solenoid valve 110 is provided in valving cavity 88 and is retained therein by twist lock assembly of lugs 112, 114 provided thereon into grooves 116, 118 formed on the opposite sides of the cavity 88 in a manner similar to the aforesaid procedure for the installation of valve 100. Although the outlet ports on the undersurface of manifold which communicate with outlet ports 106, 108 are not shown in FIG. 2*a*, they communicate with apertures 106', 108' shown in FIG. 2*a* in the gasket hereinafter described.

The upper surface of the manifold block 12 is formed generally at right angles to the surface in which valving cavities 14 through 24 are formed; and, the upper surface has a plurality of spaced pressure sensing cavities 120, 122, 124, 128 preferably aligned thereon with each of the cavities 120 through 128 communicating respectively with a selected one of the valving cavities 14 through 24, the choice depending upon the desired transmission shift program. Each of the cavities 120 through 128 has received and sealed therein a pressure switch denoted respectively 130, 132, 134, 136, 138.

The solenoids 52 through 58 and pressure switches 130, 132, 134 are held in place by a common bracket 140 having a generally right angle configuration in transverse section which has a plurality of open slots 142, 144, 146, 148 spaced therealong and located such that the opposite sides of each slot engage a corresponding groove (not shown) on each of the solenoids 52 through 58. The portion of bracket 140 formed at right angles to the slots 142 through 148, has formed thereon and spaced therealong apertures 149, 150, 152 which are each received over corresponding portions of respectively one of the pressure switches 130, 132, 134 and the sides of each of the apertures engage the surface of the respective pressure switch and retain same in the block 12.

Similarly a second bracket 154 having a generally right angle configuration in transverse section is provided and has slots 156, 158 formed, the sides of which engage grooves (not shown), formed in respectively each of the solenoids 60, 62 for retaining same in the block 12. Apertures 160, 162 are formed in the portion of bracket 154 at right angles to the slots 156, 158 and are received over respectively the pressure switches 136, 138 and the sides of the apertures bear against the top of the respective pressure switch retain same in the block 12. The brackets are secured to the block 12 by suitable fasteners (not shown) passing through apertures 164, 166, 168, formed in the brackets and engaging corresponding apertures in the block.

It will be understood that each of the pressure switches 130 through 138 has electrical terminals thereon which extend upwardly through the apertures 149 through 162; and, two of the electrical terminals are indicated typically at 172, 174 for the pressure switch 130. Terminals such as 172, 174 are adapted for connection to an unshown external electrical lead frame or wiring harness. It will be understood that each of the solenoids 52 through 62, 100, 110 also have similar terminals as shown in FIG. 2*a* typically at 175, 177, 179, 181 for external connection thereto.

In the presently preferred practice of the invention, the manifold block 12 is formed by molding as a one piece member complete with the valving cavities and associated ports and is formed of a suitable resinous material which has, for example, nylon material having about one-third fractional fill of glass particulate material. However, it will be understood that other suitable non-metallic materials may be employed which are capable of molding and compatible with the hydraulic fluids and temperature and environmental conditions of automotive transmission service. The manifold block 12 is thus able to be fabricated to "Net Shape" without costly secondary operations, such as machining operations, to achieve critical dimensions.

Figure 2B:
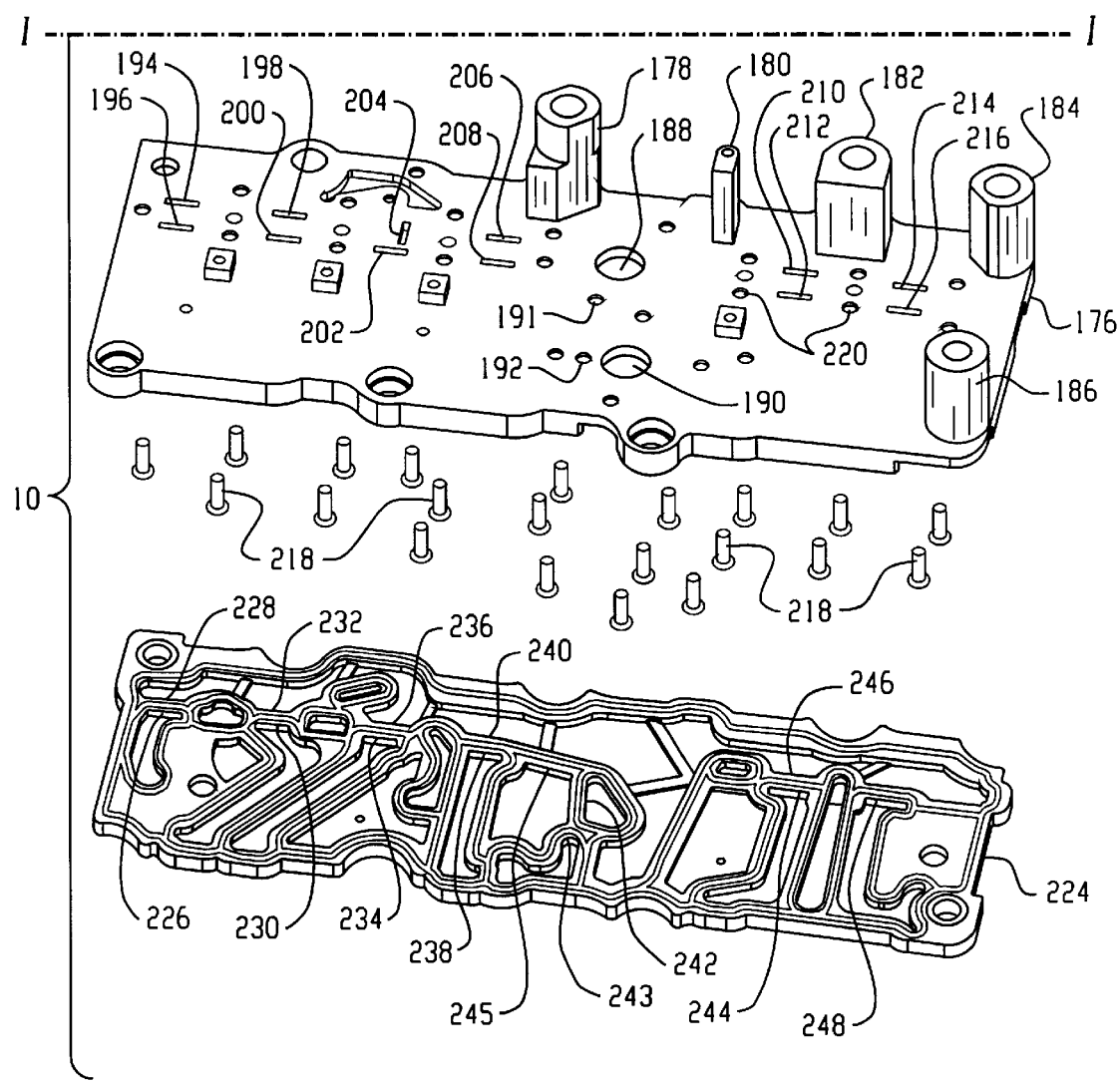

Referring to FIGS. 2*a* and 2*b*, a base member 176 has a generally flat plate configuration and is formed of metallic material with a plurality of upstanding spaced stanchions or spacers denoted by reference numerals 178, 180, 182, 184, 186 formed preferably integrally therewith and which are located for receiving fasteners (not shown) therethrough for attachment to a transmission. In the present practice of the invention the base 176 and spacers are formed integrally as one piece of preferably cast material. In the presently preferred practice, base 176 is formed of material selected from the group consisting essentially of (a) aluminum, (b) magnesium material, (c) steel stamped from sheet stock and (d) equivalents thereof; however, it will be understood that other metallic materials may be employed which will provide a part which is able to withstand, without prohibitive deflection, the forces of the hydraulic fluid pressures acting over the exposed surface area exposed to the passages formed in the hydraulic deck of the vehicle automatic transmission housing.

Base 176 has spaced apertures 188, 190 formed therethrough and located thereon so as to be aligned with the outlet passages 102, 104 formed in the bottom of the valving cavities 90, 88 in the manifold block 12. A separate aperture 191, 192 is formed through base 176 and located thereon to correspond with an outlet port (not shown) on the undersurface of the manifold block 12 which unshown outlet port communicates respectively with one of the outlet ports 106, 108 in the valving cavities 88, 90.

Base 176 has a pair of spaced slots 194, 196 formed therethrough and located thereon to each coincide with one of the inlet and outlet ports 28, 40 formed in valving cavity 14.

A second pair of slots 198, 200 are formed through base 176 in spaced arrangement and located so as to coincide each with one of the inlet and outlet ports 30, 42 formed in the valving cavity 16. A third pair of slots 202, 204 in base 176 in spaced arrangement and located thereon so as to each coincide with one of the inlet and outlet ports 32, 44 formed in the valving cavity 18 in block 12.

A fourth pair of slots 206, 208 is formed through the base 176 and each is located so as to align with one of the inlet and outlet ports 34, 46 formed in the valving cavity 20 in manifold block 12.

A fifth set of slots 210, 212 is formed through base 176 and located thereon so as to each align with one of the inlet and outlet ports 36, 48 formed in valving chamber 22 of the manifold block 12.

A sixth set of slots 214, 216 is formed through base 176 in spaced arrangement and located so as to each coincide with one of the inlet and outlet ports 38, 50 formed in the valving chamber 24 of manifold block 12.

The base 176 is attached to the undersurface of manifold block 12 by a plurality of fasteners indicated typically at 218 which pass through appropriately located apertures or clearance holes indicated typically at 220 appropriately located on base 176 so as to permit the fasteners to threadedly engage taped holes (not shown) provided on the undersurface of manifold block 12.

The ports on the upper surface of base 176 and the undersurface of manifold block 12 are sealed by an appropriately configured gasket 222, which in the presently preferred practice of the invention is formed preferably of material selected from the group consisting essentially of (a) paper and (b) elastomeric material although other suitable materials may be employed. The gasket 222 has passages formed therein corresponding to the inlet and outlet ports for each of the valves 52 through 58, 60, 62, 100, 110 and which conform to the slots or apertures formed in the base 176 and are denoted by corresponding reference numerals primed (e.g., 194', 196'. . . 188', 190'. . . ).

Referring to FIG. 2b, a second gasket 224 is provided for sealing the undersurface of the base 176 against the unshown surfaces of the vehicle transmission housing. In the presently preferred practice the gasket 224 is formed of a substrate such as, for example a plastic frame, such as, for example a nylon frame having resilient seal material disposed thereabout in strip or ribbon-like form for facilitating sealing about the various ports in the gasket which are located to coincide with the inlet and outlet ports for the solenoid valve.

In particular aperture 226 is sealed for communication with slot 196; aperture 228 sealed for communication with slot 194; aperture 230 sealed for communication with slot 200; aperture 232 sealed for communication with slot 198; aperture 234 sealed for communication with slot 202; aperture 236 sealed for communication with slot 204; aperture 238 sealed for communication with slot 208; aperture 240 sealed for communication with slot 206 and aperture 188; aperture 242 sealed for communication with aperture 190; aperture 243 sealed for communication with port 192; aperture 245 sealed for communication with port 191; aperture 244 sealed for communication with slot 212; aperture 246 sealed for communication with slots 210, 214; and, aperture 248 sealed for communication with slot 216.

The gasket 224 is attached to the undersurface of the base 176 for shipment by any convenient expedient as, for example, barbed clips formed on the gasket (not shown) or separate mechanical clips (not shown). It will be understood that the apertures in the gasket 224 are located to connect the various inlet and outlet ports in base 176 with the pattern of hydraulic passages employed on the particular automatic transmission to which the assembly 10 is intended for attachment.

The present invention thus provides an electro-hydraulic controller having a plurality of solenoid valves mounted on a non-metallic and preferably plastic manifold block which may be molded to provide the precision cavities for receiving and sealing the solenoid valves and providing the appropriate ports for the valves and to set dimensions without machining. The manifold block is attached to a metallic base which is preferably of cast aluminum and which has the requisite stiffness to resist the hydraulic pressure forces applied thereto upon attachment of the complete controller assembly to the hydraulic passages formed in the deck of the transmission housing. The present invention thus provides an easy to manufacture and reduced cost controller for providing electrical shift control of a vehicle automatic transmission.

Although the invention has hereinabove been described with respect to the illustrated embodiments, it will be understood that the invention is capable of modification and variation and is limited only by the following claims.

What is claimed is:

1. An electro-hydraulic controller assembly comprising:
   (a) a manifold formed of non-metallic material with a plurality of spaced supply ports formed therein and a plurality of spaced valving cavities each communicating with one of said supply port with each cavity having a transfer port;
   (b) an electrically operated valve mounted in each of said cavities with the outlet of the valve communicating with the respective transfer port;
   (c) a base formed of metallic material having a plurality of inflow apertures therethrough with one of said inflow apertures located to correspond with each of said supply ports and a plurality of outflow apertures each located to correspond with one of said transfer ports; and,
   (d) means securing said manifold to said base including a first gasket disposed between said manifold and said base and sealing therebetween; and, a second gasket disposed against a surface of said base distal said manifold and adapted for sealing between said base and a surface of an engine.

2. The controller assembly defined in claim 1, wherein said manifold is formed of polymeric material and said base is formed of aluminum material.

3. The controller assembly defined in claim 1, wherein said manifold is formed of polymeric material fractionally filled with particulate glass material.

4. The controller assembly defined in claim 1, wherein said base is formed essentially of aluminum material.

5. The controller assembly defined in claim 1, wherein said second gasket includes elastomeric material.

6. The controller assembly defined in claim 1, wherein said base is formed of cast aluminum material.

7. The controller assembly defined in claim 1, wherein said first gasket is formed from the group consisting essentially of (a) paper and (b) elastomeric material.

8. The controller assembly defined in claim 1, wherein said means securing said manifold to said base includes threaded fasteners.

9. The controller assembly defined in claim 1, further comprising a bracket secured to said manifold operative for retaining each of said electrically operated valves in said cavity.

10. The controller assembly defined in claim 1, further comprising at least one pressure responsive switch attached to said manifold for sensing pressure in at least one of said cavities.

11. The controller assembly defined in claim 10 includes a bracket secured to said manifold operative for retaining each of said electrically operated valves and said at least one pressure switch.

12. A method of making an electro-hydraulic controller comprising:
   (a) forming a manifold of non-metallic material with a plurality of spaced supply ports therein and a plurality of spaced valving cavities and communicating each valving cavity with one of said supply ports and forming an exit port in each cavity;
   (b) disposing an electrically operated valve in each of said cavities and communicating the inlet thereof with the supply port and communicating the valve outlet with said exit port;
   (c) forming a base of metallic material having a plurality of inflow apertures and a plurality of outflow apertures therethrough and disposing said base adjacent said manifold with said inflow apertures communicating with said supply ports;

(d) disposing an inflow and outflow ported first gasket between said manifold and said base and securing said base to said manifold and sealing said gasket therebetween with the ports aligned; and, (e) disposing a second gasket adjacent a surface of base distal said manifold for sealing base on an engine.

13. The method defined in claim 12, wherein said step of securing said base to said manifold includes rotating threaded fasteners.

14. The method defined in claim 12, wherein said step of forming a manifold includes forming a manifold of polymeric material fractionally filled with particulate glass.

15. The method defined in claim 12, wherein said step of forming a base includes forming a base of material selected from the group consisting essentially of (a) aluminum, (b) magnesium, (c) steel stamped from sheet stock and (d) equivalents thereof.

16. The method defined in claim 1, wherein said step of disposing a first gasket includes disposing a first gasket of material selected from the group consisting essentially of (a) paper and (b) elastomeric material.

17. The method defined in claim 1, wherein said step of disposing a second gasket includes disposing a gasket including elastomeric material.

\* \* \* \* \*